(12) United States Patent
Fohn et al.

(10) Patent No.: US 11,277,408 B2
(45) Date of Patent: Mar. 15, 2022

(54) DEVICES AND METHODS FOR ENABLING AUTHORIZATION AND COMMUNICATION BETWEEN INDIRECTLY RELATED PARTIES VIA NETWORKED COMPUTING SYSTEMS USING DATA MODELS WITH NESTED PARTY RELATIONSHIPS

(71) Applicant: ADP, LLC, Roseland, NJ (US)

(72) Inventors: Steffen Fohn, Lexington, NC (US); Richard Bruce Humphrey, Sunset Beach, NC (US)

(73) Assignee: ADP, LLC, Roseland, NJ (US)

( * ) Notice: Subject to any disclaimer, the term of this patent is extended or adjusted under 35 U.S.C. 154(b) by 969 days.

(21) Appl. No.: 15/985,381

(22) Filed: May 21, 2018

(65) Prior Publication Data
US 2019/0356660 A1 Nov. 21, 2019

(51) Int. Cl.
*H04L 29/06* (2006.01)

(52) U.S. Cl.
CPC ...... *H04L 63/0884* (2013.01); *H04L 63/0892* (2013.01); *H04L 63/104* (2013.01); *H04L 63/105* (2013.01)

(58) Field of Classification Search
CPC ............. H04L 63/0884; H04L 63/0892; H04L 63/104; H04L 63/105; H04L 63/20
See application file for complete search history.

(56) References Cited

U.S. PATENT DOCUMENTS

| | | | | |
|---|---|---|---|---|
| 8,224,873 B1* | 7/2012 | Korablev | ............. | G06F 21/604 707/809 |
| 2003/0115292 A1* | 6/2003 | Griffin | .................. | H04L 67/306 709/219 |
| 2006/0005036 A1* | 1/2006 | Hu | .......................... | H04L 67/42 713/182 |
| 2014/0298483 A1* | 10/2014 | Kato | ...................... | H04L 63/20 726/27 |

* cited by examiner

*Primary Examiner* — Minh Dinh
(74) *Attorney, Agent, or Firm* — Yee & Associates, P.C.

(57) ABSTRACT

A method for using a data model to enable authorization and communication between computers including a first computer configured to provide a service, a second computer in communication with the first computer, and a third computer in communication with one or both of the first computer and the second computer. The method includes storing the data model, wherein the data model describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party.

15 Claims, 15 Drawing Sheets

DEVICES AND METHODS FOR ENABLING AUTHORIZATION AND COMMUNICATION BETWEEN INDIRECTLY RELATED PARTIES VIA NETWORKED COMPUTING SYSTEMS USING DATA MODELS WITH NESTED PARTY RELATIONSHIPS

BACKGROUND INFORMATION

1. Field

The present disclosure relates to improved devices and methods for enabling authorization and communication between indirectly related parties and computing systems using data models with nested party relationships.

2. Background

Modern service providers offer services and software solutions for a wide variety of customers. For example, many forms of software are provided as a service for a fee. Access to the software is usually accomplished via the Internet or other network connection after proper authentication has been established. However, customers are demanding not only more complex services, but greater flexibility in accessing these services. In some cases, authorization of a third party via an authorized primary contracting party to access the service can be difficult. Indirect relationships among customers and the provider can cause undesirable authorization problems. Thus, methods and devices are needed to improve authorization and communication between indirectly related parties via networked computing systems.

SUMMARY

The illustrative embodiments provide for a method for using a data model to enable authorization and communication between computers including a first computer configured to provide a service, a second computer in communication with the first computer and configured to consume the service, and a third computer in communication with one or both of the first computer and the second computer. The method includes storing, using a processor, the data model, wherein the data model describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party. The method also includes receiving a request at the first computer to use the service, the request being from at least one of the second party and the third party via the second computer or the third computer. The method also includes determining, using the processor in conjunction with the data model, whether the request has authorization to use the service, whereby a determination is made. The method also includes granting or denying, using the processor and based on the determination, access to the service to at least one of the second computer and the third computer.

The illustrative embodiments also contemplate a computer including a processor and a non-transitory computer readable storage medium storing program code which, when executed by the processor, performs the above method. The illustrative embodiments also contemplate the non-transitory computer readable storage medium itself.

The illustrative embodiments also include a data model, stored on a non-transitory computer readable storage medium, executable by a computer to enable authorization and communication between computers including a first computer configured to provide a service, a second computer in communication with the first computer and configured to consume the service, and a third computer in communication with one or both of the first computer and the second computer. The data model includes a data structure storing data which describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
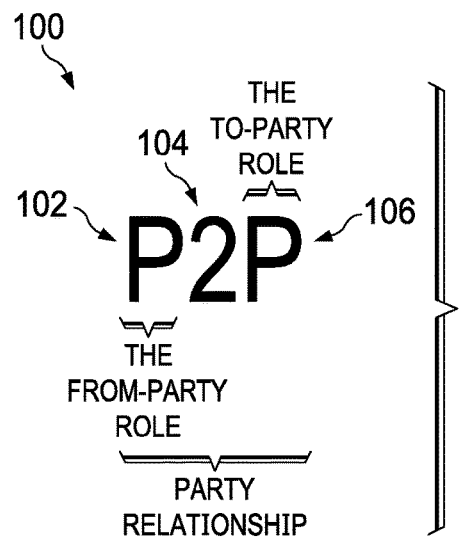
FIG. 1 illustrates a nomenclature for describing party relationships in a data model, in accordance with an illustrative embodiment.

The illustrative embodiments recognize and take into account the issues described above in the background. The illustrative embodiments also recognize and take into account that service provider organizations in the Internet age are facing an ever-varying and increasing set of business models or situations that are to be accommodated. Managing authorization to services in this environment poses a significant problem. For some organizations, the traditional B2B and B2C business models remain relevant and represent of the extent of party relationships that they must manage in their authorization models.

The illustrative embodiments also recognize and take into account that, for service provider organizations, this simple arrangement is rarely the case. Instead service providers must support additional models nested under the traditional, primary models. For example, the traditional B2B business model is extended to the "employee" in the B2B2E model and extended to the "consumer" in B2B2C model. The ecosystem for a service provider, by its very nature, is broad. The ecosystem necessarily includes, not only clients, but also partners and third parties such as but not limited to client partners, client's workers and client's worker designees. The possible set of nested business models quickly becomes expansive, necessitating a supporting authorization model which currently does not exist.

Therefore, there exists a long felt, but unmet need for an improved data model that provides an adequate description between parties such that a service provider can provide authorization to indirectly related parties and computer systems. The illustrative embodiments address this long-felt, but unmet need.

In particular, the illustrative embodiments provide for a P2P.2P authorization model. This model offers a solution for managing authorizations among parties in an ecosystem characterized by nested business models. In this authorization model a business model is realized through a party relationship. As such, nested business models are realized with nested party relationships. The authorization model of the illustrative embodiments uniquely applies the party relationship concept to manage computer-based authorizations between parties participating in the relationship.

As used herein, the following terms have the following definitions:

An "authorization model" is strictly a data model implemented as a data structure stored on a non-transitory computer readable storage medium for use in processor-based computations described elsewhere herein.

"B2E" is "business to employee". While this term describes a relationship among parties, in the context of the claims this term strictly refers to a data structure in a data model that defines this relationship for purposes computations described elsewhere herein.

"B2B" is "business to business." This relationship defines the transactions between businesses, and in many cases is becoming more and more automated with time. While this term describes a relationship among parties, in the context of the claims this term strictly refers to a data structure in a data model that defines this relationship for purposes computations described elsewhere herein.

"B2C" is "business to consumer". This relationship is used as a catch-all phrase for users who are individuals. Depending on the organization, the B2C relationship may be a government to consumer relationship, a school to student relationship, a hospital to patient relationship, or some other business to consume relationship. While this term describes a relationship among parties, in the context of the claims this term strictly refers to a data structure in a data model that defines this relationship for purposes computations described elsewhere herein.

"B2B2E" is "business to business to employee." While this term describes a relationship among parties, in the context of the claims this term strictly refers to a data structure in a data model that defines this relationship for purposes computations described elsewhere herein.

"B2B2C" is "business to business to consumer." While this term describes a relationship among parties, in the context of the claims this term strictly refers to a data structure in a data model that defines this relationship for purposes computations described elsewhere herein.

"B2W" is "business to worker." A B2E relationship may be considered a specialization of the more general B2W relationship. The term "worker" includes a wide variety of relationships including sub-contractors and external contractors, and the like, whereas the term "employee" specifically refers to an employee. While "B2W" describes a relationship among parties, in the context of the claims this term strictly refers to a data structure in a data model that defines this relationship for purposes computations described elsewhere herein.

A "business model" is strictly a data model implemented as a data structure stored on a non-transitory computer readable storage medium for use in processor-based computations described elsewhere herein.

"P2P" is "party to party." This term represents a business model or situation where the first party offers computer-based services to the second party. This term subsumes the B2E, B2B, and B2C models. While this term describes a relationship among parties, in the context of the claims this term strictly refers to a data structure in a data model that defines this relationship for purposes computations described elsewhere herein.

"P2P.2P" is "party to party to party," with each party appearing after the period being nested with respect to the prior party. This term contemplates any number of nested parties, such as but not limited to P2P.2P.2P . . . , etc. Thus, this term extends the P2P model. While this term describes a relationship among parties, in the context of the claims this term strictly refers to a data structure in a data model that defines this relationship for purposes computations described elsewhere herein.

A "service", unless stated explicitly otherwise, is strictly a computer-based service provided from one computer to another computer, or possibly a license to use software on a single computer. Unless stated otherwise, a "service" is never directly provided by a human.

FIG. 1 illustrates a nomenclature for describing party relationships in a data model, in accordance with an illustrative embodiment. An example of an actual computer-based data model used to represent P2P relationship 100 is shown FIG. 3.

P2P relationship 100 includes first P 102, which represents the "from party" role. That is, first P 102 is the party that provides a computer-based service. Number two 104 is an abbreviation which stands for the English word "to", and represents a direct relationship with second P 106, which is the second party which receives the computer-based service. Thus, second P 106 has the "to party" role. This nomenclature can be used in a computerized data model to designate the relationships of parties to each other in a manner that a computer can use for calculations.

Figure 2:
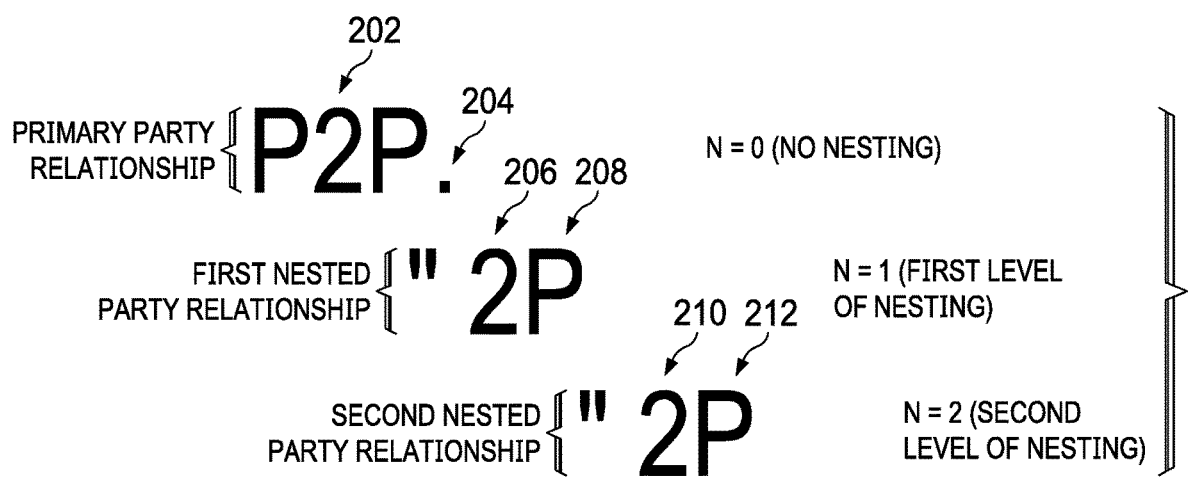
FIG. 2 illustrates a nomenclature for describing nested party relationships in a data model, in accordance with an illustrative embodiment.

FIG. 2 illustrates a nomenclature for describing nested party relationships in a data model, in accordance with an illustrative embodiment. An example of an actual computer-based data model used to represent P2P.2P relationship 200 is shown FIGS. 9A and 9B.

P2P.2P relationship 200 is a nested party relationship of the illustrative embodiments, which to date has not been implemented in business models. For example, Ruddy 2017 states that "Business-to-business-to-employee (B2B2E) and business-to-business-to-consumer (B2B2C) relationship life cycle management are not well-supported by many IAM (identity and access management) systems." Thus, authorization of the "to-party" role of a nested party relationship at a deeper level of nesting, N greater than or equal to two, is not well-defined or supported.

P2P relationship 202 is similar to P2P relationship 100 of FIG. 1. P2P relationship 202 is the primary party relationship, or N=zero. Period 204 indicates the nested relationship among the subsequent "to party" roles. Number two 206, or "to", is a designation of the relationship to the next nested party, second P 208, in a first level of nesting. Similarly, number two 210, or "to", is a designation of the relationship to the next nested party, third P 212, in a second level of nesting.

A party relationship is a parent party relationship if it has child party relationships, and vice versa. A party relationship is a nested, or descendant, party relationship if it has a parent party relationship. All child party relationships are nested, or descendant, party relationships. A party relationship may be nested N ("a number of") levels from the primary party relationship, the originated party relationship. A set of nested party relationships forms a party relationship hierarchy.

Attention is now turned to differences between the following relationships: P2P, P2P2P, and P2P.2P. In a P2P relationship, a service provider may participate in many primary party relationships with other service consumer parties, that is the client parties or partner parties that consume services from the service provider. A service provider party (the from-party role) must be able to authorize or grant permission to the service consumer party (the "to-party" role) with whom it is in a defined party relationship. In today's service relationships, authorization of the "to-party" role in a primary party relationship is commonly achieved by explicit permission assignment in a data model for each party in the to-party role. For example, the client may contract services from the service provider; the service provider therefore manages a list of contracted services for each client.

Attention is now turned to the P2P2P relationship. The service consumer party, the "to-party" role of a primary party relationship, may participate in other party relationships under the primary party relationship with other service consumer parties, such as employees, that consume services form the service provider (the "from-party" role of the primary party relationship). A service consumer party, the "from-party", must be able to authorize or grant permissions to the service consumer party (the "to-party" role) with whom it is in a defined party relationship. The authorization of the "to-party" role must be a subset of authorization of the "from-party" role.

Today, authorization of the "to-party" role of a nested party relationship is commonly achieved by one of the following methods. First, explicit permission assignment may be made by the "from-party" role. Second, an RBAC (role based access control) technique may be used where the "to-party" role is given membership to an access control group with set permissions. Thus, the group is managed by the "from-party" role. Third, an ABAC (attribute-based access control) technique may be used where attributes of the "to-party" role (reflected in the objects to be accessed) are used to acquire permissions dynamically. This approach is well-suited in cases where the attribute value is constantly changing, such as the physical location of the party, a time of day at the party's location, etc.

Attention is now turned to the nested P2P.2P relationship structure, which is different than the P2P2P relationship structure. The service consumer party, the "to-party" role of a nested party relationship, may participate in other party relationships (at N greater or equal to two), nested under a nested party relationship (at N−1), with other service consumer parties of the "from-party" role of the primary party relationship. (e.g. client employees that consume services from the service provider). A service consumer party (the "from-party") must be able to authorize or grant permissions to the service consumer party (the "to-party" role) with whom it is in a defined party relationship. The authorization of the "to-party" role must be a subset of authorization of the "from-party" role.

Today, authorization of the "to-party" role of a nested party relationship is not well-defined or supported. The illustrative embodiments described below solve this technical problem.

Figure 3:
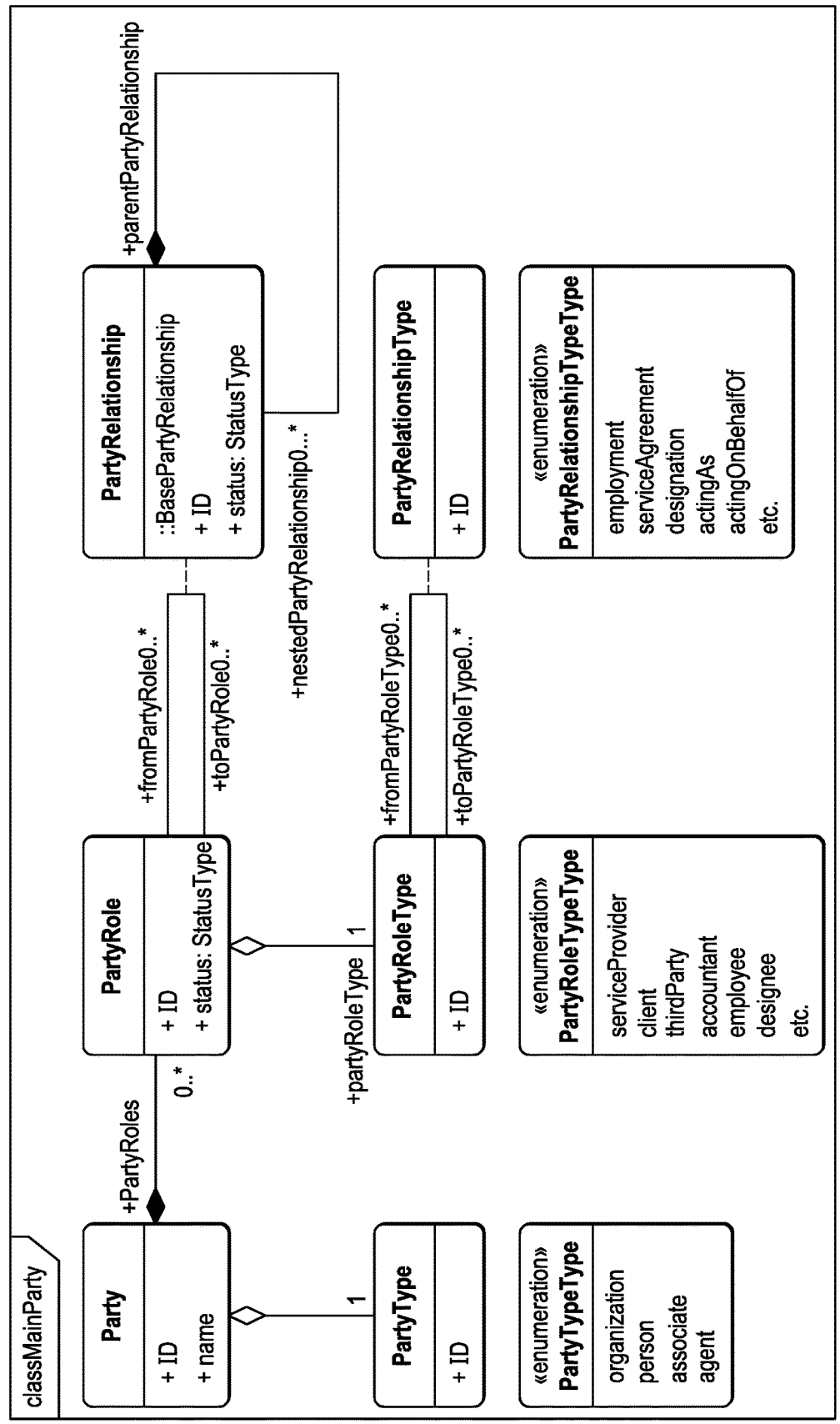
FIG. 3 illustrates a data model for describing party relationships for use by a computer, in accordance with an illustrative embodiment.

FIG. 3 illustrates a data model for describing party relationships for use by a computer, in accordance with an illustrative embodiment. Data model 300 uses industry standard legends, designations, and nomenclature to indicate how to create a data structure which implements data model 300. Data model 300 may be used to implement a party relationship in a manner which a computer can use to perform calculations to establish a computerized communication, authorization, and/or authentication when an access to services is requested of the primary party.

With respect to data model 300, a party relationship is a relationship between party roles. A party role is a role assigned to a party that classifies how the party is understood to act in some context, such as a computer-based service provider context. A party is a generalization representing either an individual (person, agent) or an organization.

Figure 4:
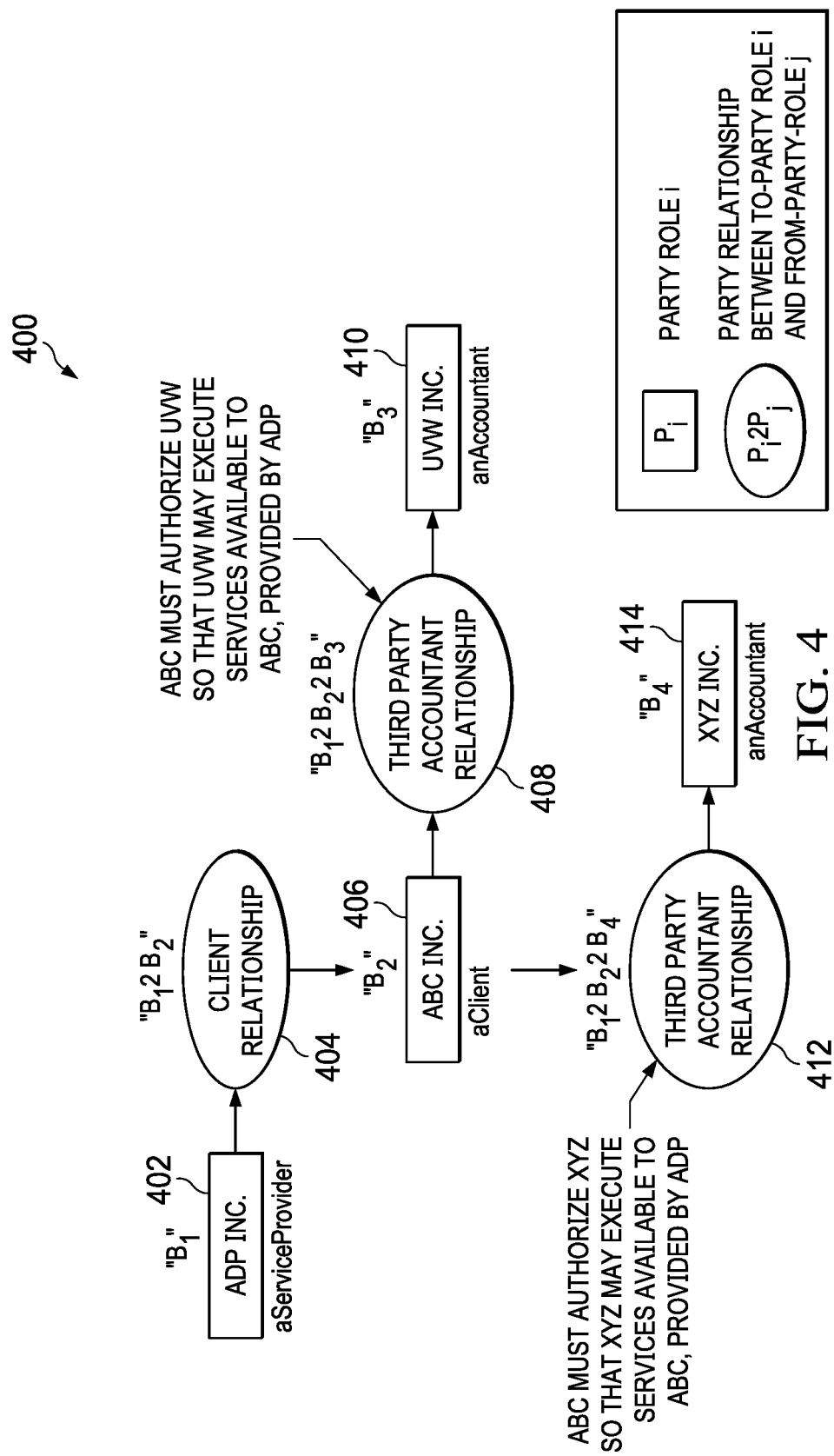
FIG. 4 illustrates a nested party relationship for a client's partner scenario and nested party relationship terminology, in accordance with an illustrative embodiment.

FIG. 4 illustrates a nested party relationship for a client's partner scenario and nested party relationship terminology, in accordance with an illustrative embodiment. Scenario 400 thus presents a B2B2B scenario for which the illustrative embodiments describe a nested data model to handle all levels of the nested relationships.

In scenario 400, ADP is a service provider designated as $B_1$ 402. $B_1$ has a client relationship, as indicated by $B_1 2B_2$ 404 with ABC $B_2$ 406. In turn, ABC $B_2$ 406 has a third-party accountant relationship, $B_1 2B_2 2B_3$ 408, with UVW $B_3$ 410. Likewise, ABC $B_2$ 406 has a third party accountant relationship, $B_1 2B_2 2B_4$ 412, with XYZ $B_4$ 414.

Figure 9A:
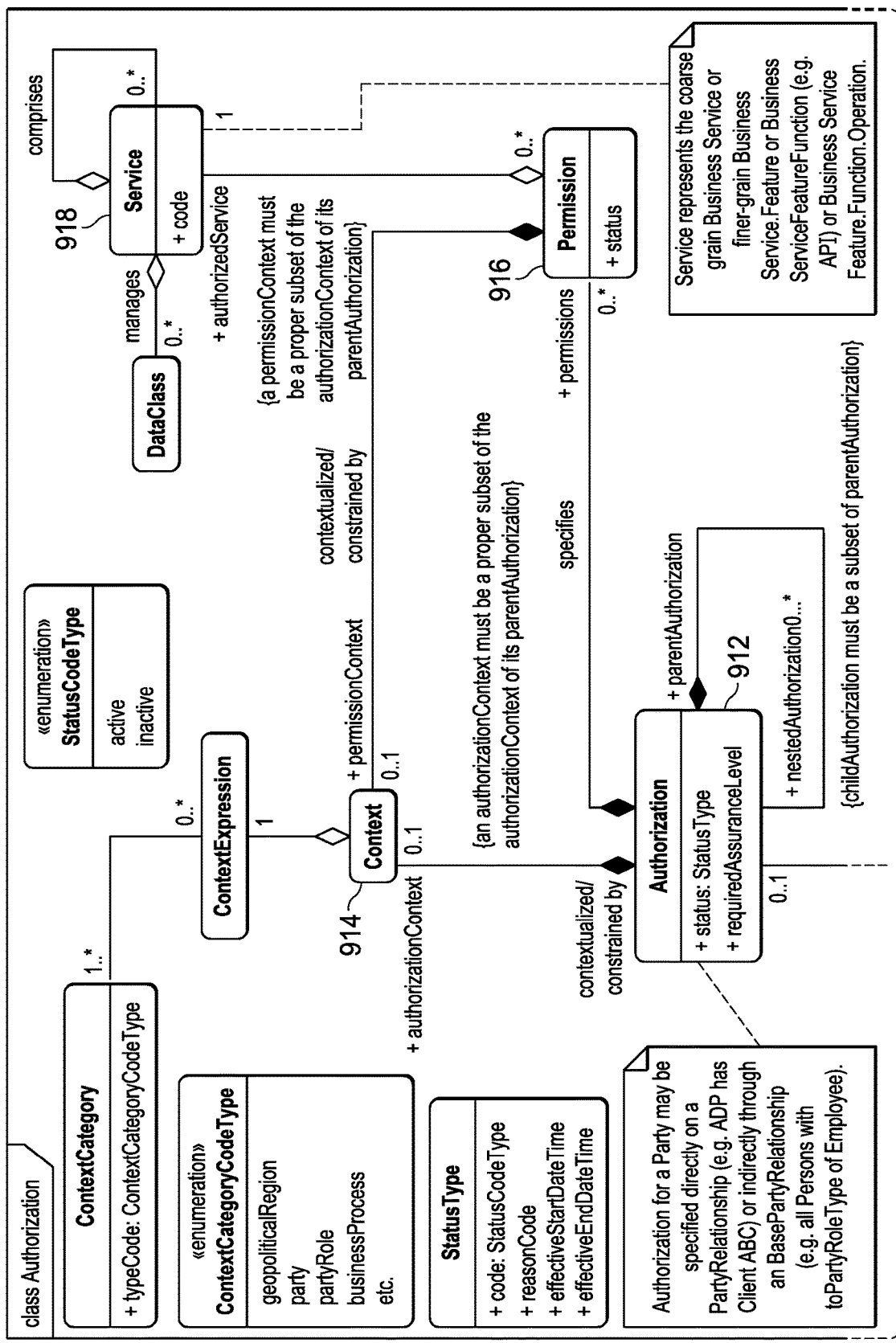
FIGS. 9A and 9B illustrate a nested party authorization data model useable by a computer to provide proper authorization when a request for service is made from a client computer to a service provider's computer, in accordance with an illustrative embodiment.
Figure 9B:
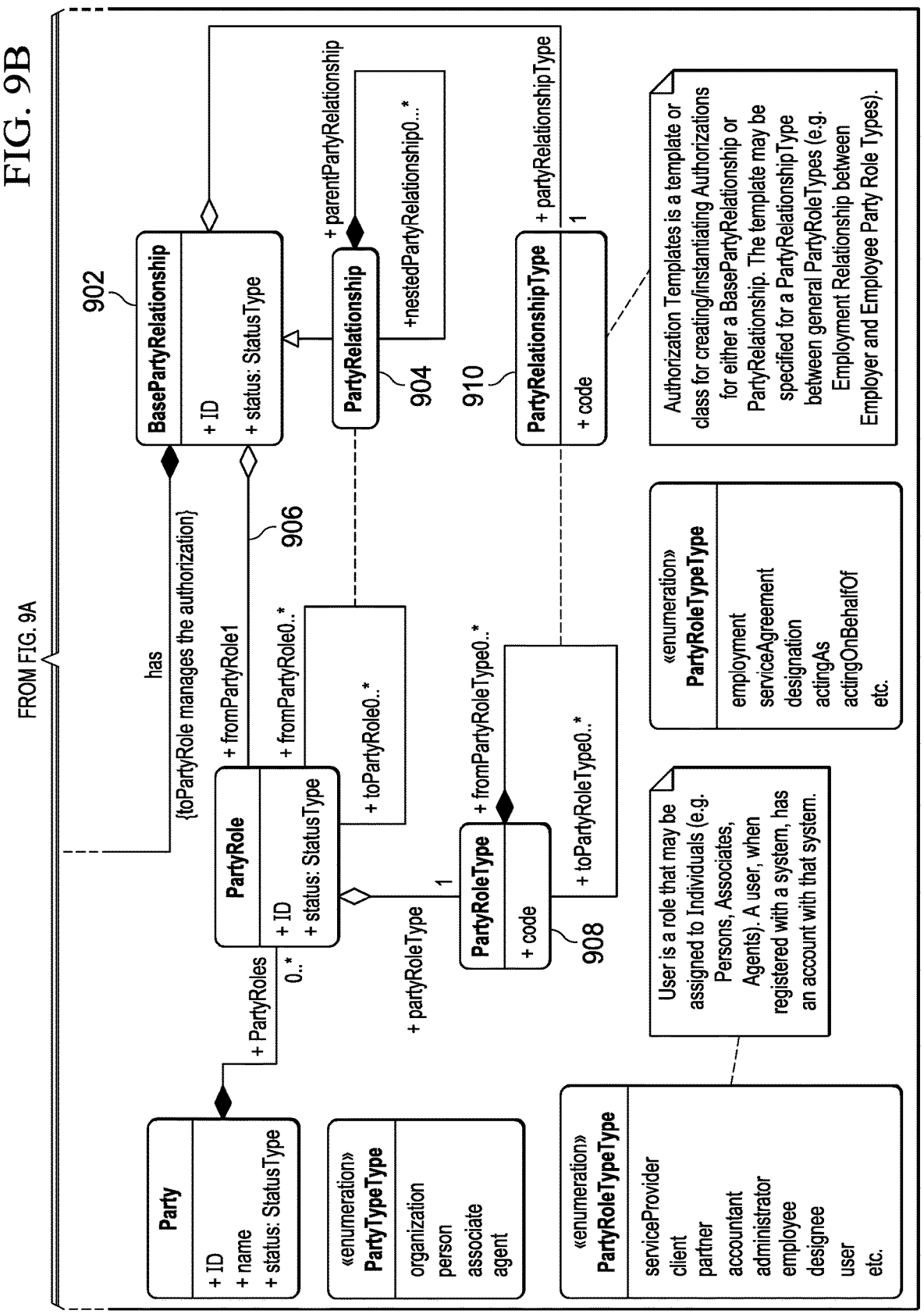

ABC must authorize UVW so that UVW may execute services available to ABC, which are provided by ADP. ABC must also authorize XYZ so that XYZ may execute services available to ABC, provided by ADP. A specific data model enabling the computer authorizations for this scenario is shown in FIGS. 9A and 9B.

Figure 5:
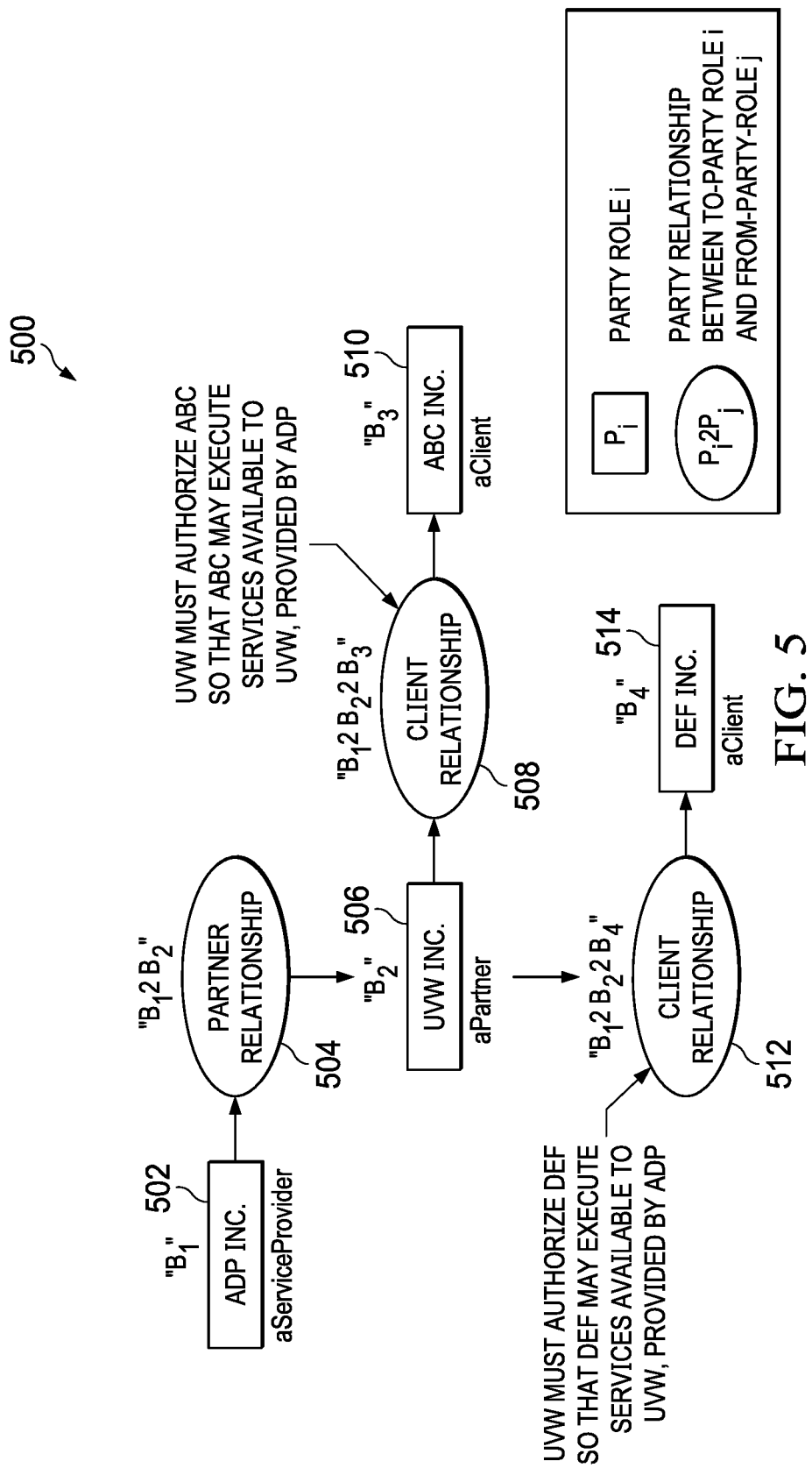
FIG. 5 illustrates a nested party relationship for a partner's client scenario and nested party relationship terminology, in accordance with an illustrative embodiment.

FIG. 5 illustrates a nested party relationship for a partner's client scenario and nested party relationship terminology, in accordance with an illustrative embodiment. Scenario 500 thus presents another B2B2B scenario for which the illustrative embodiments describe a nested data model to handle all levels of the nested relationships.

In scenario 500, ADP $B_1$ 502 has client relationship $B_1 2B_2$ 504 with UVW $B_2$ 506. In turn UVW has client relationship $B_1 2B_2 2B_3$ 508 with ABC $B_3$ 510 and also has client relationship $B_1 2B_2 2B_4$ 512 with DEF $B_4$ 514. UVW must authorize ABC so that ABC may execute services available to UVW, provided by ADP. UVW must also authorize DEF so that DEF may execute services available to UVW, provided by ADP. A specific data model enabling the computer authorizations for this scenario is shown in FIGS. 9A and 9B.

Figure 6:
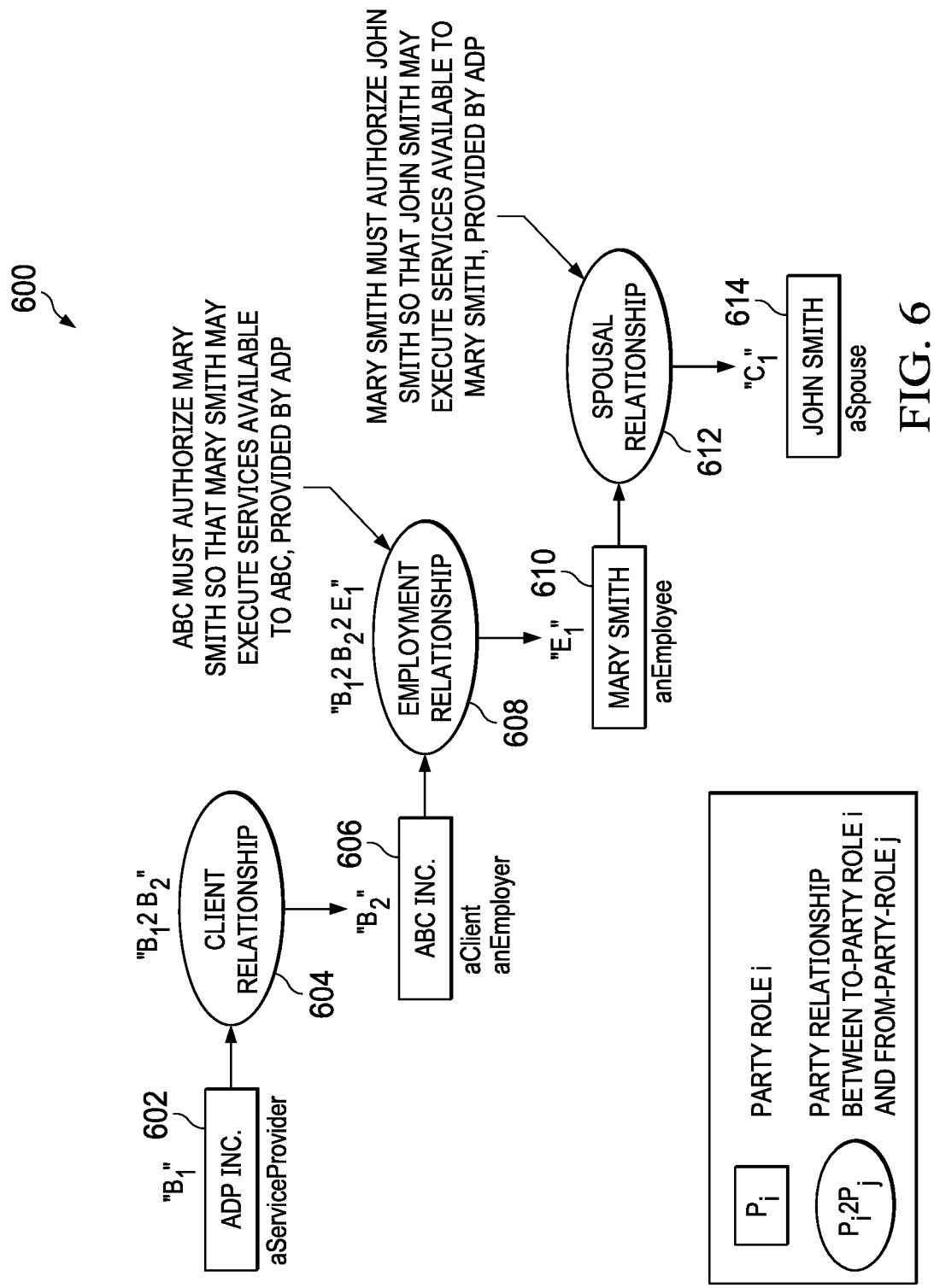
FIG. 6 illustrates a nested party relationship for a client's employee's spouse scenario and nested party relationship terminology, in accordance with an illustrative embodiment.

FIG. 6 illustrates a nested party relationship for a client's employee's spouse scenario and nested party relationship terminology, in accordance with an illustrative embodiment. Scenario 600 thus presents a B2B2E scenario for which the illustrative embodiments describe a nested data model to handle all levels of the nested relationships.

In scenario 600, ADP $B_1$ 602 has client relationship $B_1 2B_2$ 604 with ABC $B_2$ 606. In turn, ABC $B_2$ 606 has an employment relationship $B_1 2B_2 2E_1$ 608 with Mary Smith $E_1$ 610. Mary Smith $E_1$ 610 has spousal relationship $E_1 C_1$ 612 with John Smith $C_1$ 614. In this relationship, ABC must authorize Mary Smith so that Mary Smith may execute services available to ABC provided by ADP. Additionally, Mary Smith must authorize John Smith so that John Smith may execute services available to Mary Smith, provided by ADP. The data model shown in FIGS. 9A and 9B may be modified to accommodate scenario 600.

Figure 7:
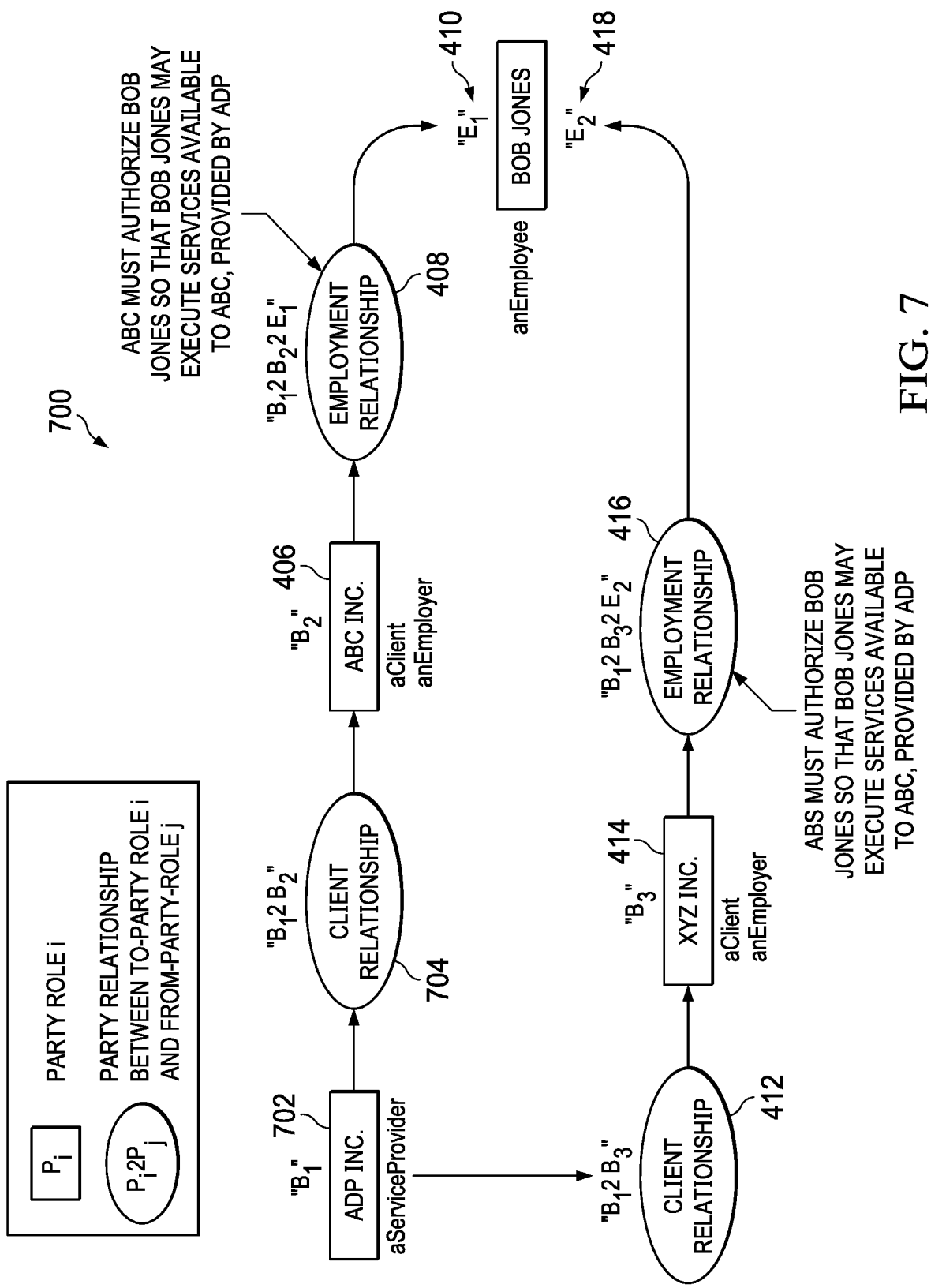
FIG. 7 illustrates a nested party relationship for a single person being two client's employees scenario and nested party relationship terminology, in accordance with an illustrative embodiment.

FIG. 7 illustrates a nested party relationship for a single person being two client's employees scenario and nested party relationship terminology, in accordance with an illustrative embodiment. Scenario 700 thus presents a B2B2E scenario for which the illustrative embodiments describe a nested data model to handle all levels of the nested relationships.

In scenario 700, ADP $B_1$ 702 has client relationship $B_1 2B_2$ 704 with ABC $B_2$ 406. In turn ABC $B_2$ 406 has employment relationship $B_1 2B_2 2E_1$ 408 with Bob Jones $E_1$ 410, an employee. However, in addition, ADP $B_1$ 702 has client relationship $B_1 2B_3$ 412 with XYZ $B_3$ 414. In turn, XYZ $B_3$ 414 has employment relationship $B_1 2B_3 2E_2$ 416 with Bob Jones $E_2$ 418. In other words, the person "Bob Jones" has two different jobs with different employers, both of whom have client relationships with ADP $B_1$ 702. Therefore, the person "Bob Jones" has two different identified relationships in the data model for scenario 700: $E_1$ and $E_2$.

ABC must authorize Bob Jones so that Bob Jones may execute services available to ABC, provided by ADP. In addition, XYZ must authorize Bob Jones so that Bob Jones may execute services available to XYZ, provided by ADP. The data model shown in FIGS. 9A and 9B may be modified to accommodate scenario 700.

Figure 8:
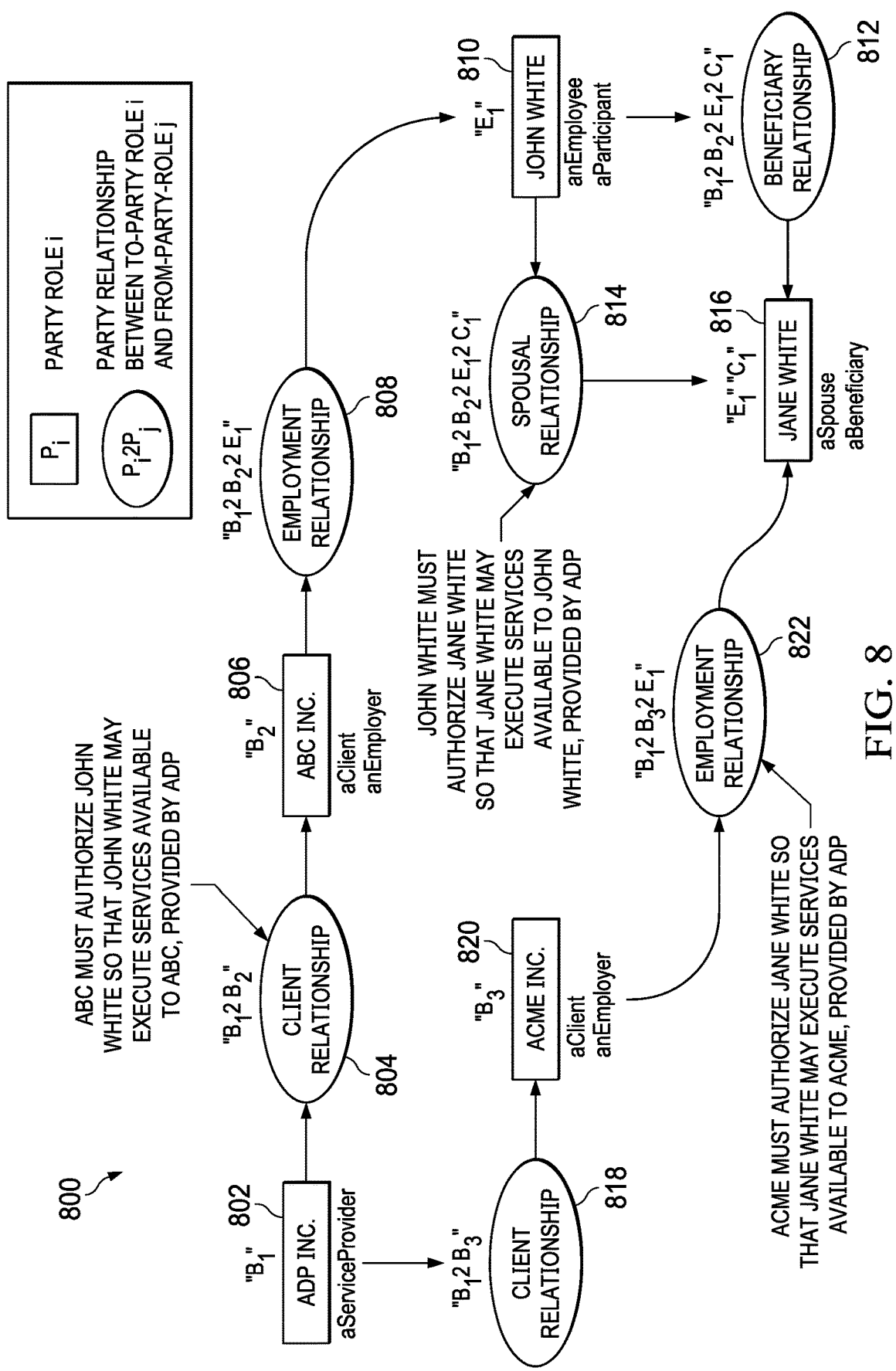
FIG. 8 illustrates a nested party relationship for a scenario in which a same person is one client's employee and another client's employee's spouse and nested party relationship terminology, in accordance with an illustrative embodiment.

FIG. 8 illustrates a nested party relationship for a scenario in which a same person is one client's employee and another client's employee's spouse and nested party relationship terminology, in accordance with an illustrative embodiment. Scenario 800 thus presents a B2B2E2C scenario for which the illustrative embodiments describe a nested data model to handle all levels of the nested relationships.

In scenario 800, ADP $B_1$ 802 has client relationship $B_1 2B_2$ 804 with ABC $B_2$ 806. In turn ABC $B_2$ 806 has employment relationship $B_1 2B_2 2E_1$ 808 with John White $E_1$ 810. In turn, John White has two relationships with his spouse, Jane White, with respect to the data model. In particular, John White $E_1$ 810 has beneficiary relationship $B_1 2B_2 2E_1 2C_1$ 812 and also spousal relationship $B_1 2B_2 2E_1 2C_1$ 814 with Jane White $E_1 C_1$ 816. However, ADP $B_1$ 802 also has client relationship $B_1 2B_3$ 818 with ACME $B_3$ 820, who in turn has employment relationship $B_1 2B_3 2E_1$ 822 with Jane White $E_1 C_1$ 816.

Thus, ABC must authorize John White so that John White may execute services available to ABC, provided by ADP. John White must also authorize Jane White so that Jane White may execute services available to John White, provided by ADP. Two authorizations of Jane White are specified per the two relationships with John White, one in the context of "spousal" and another in the context of "beneficiary". Further, ACME must authorize Jane White so that Jane White may execute services available to ACME, provided by ADP. The data model shown in FIGS. 9A and 9B may be modified to accommodate scenario 800.

FIGS. 9A and 9B illustrates a nested party authorization data model useable by a computer to provide proper authorization when a request for service is made from a client computer to a service provider's computer, in accordance with an illustrative embodiment. Data model 900 uses industry-standard legends, designations, and nomenclature to indicate how to create a data structure which implements data model 900. Data model 900 may be used to implement a nested party relationship in a manner which a computer can use to perform calculations to establish a computerized communication and/or authentication when an access to services is requested of the primary party.

Data model 900 specifically supports a nested party relationship which, prior to the presently claimed invention, could not be implemented using a computer. Thus, data model 900 represents a technical effect or a technical solution to a computer-based problem.

Attention is turned to certain aspects of data model 900. BasePartyRelationship 902 is a partial PartyRelationship 904 that allows for the specification of an authorization by the fromPartyRole 906 for a toPartyRoleType 908 (defined in the PartyRelationshipType 910). This arrangement allows an RBAC-style, role-based, authorization to be defined in the P2P.2P authorization model shown in FIGS. 9A and 9B.

PartyRelationship 904 is an associative entity that resolves the typical many-to-many relationship that exists between two party roles (e.g. a person party, as an employee party role, is related to an organization party, as an employer party role, through an employment party relationship. A party relationship may have an assurance level indicating authentication requirements.

Authorization 912 defines the right and permissions to services that are granted to a To-PartyRoleType 908 or a To-PartyRole (in a PartyRelationship 904).

An authorization may be specified broadly from a specific fromPartyRole to the general toPartyRoleType; specifically from a specific fromPartyRole to a specific toPartyRole. An authorization may be contextualized (i.e. be relevant to a specific context, e.g. a geo political region or an organization unit or department.

An authorization template is a template or class for creating or instantiating authorizations for either a BasePartyReltionship or PartyRelationship. The template may be specified for a PartyRelationshipType between general PartyRoleTypes (e.g. employment relationship between employer and employee party role types).

Context 914 may modify an authorization or permission. Thus, an authorization or permission may be bounded to a context in which the authorization or permission applies. The context may, for example, define the boundary or scope of an authorization or permission to data records specific to a geopolitical region, an organization unit, a person, etc.

Permission 916 is a grant or an approval to access a service. A permission may be contextualized, further refining the Authorization Context.

Service 918 is either a coarse-grain business service or finer-grain decomposition of the business service (e.g. business service.feature or business service feature function (at the application programming interface (API) level) or business service Feature.Function.Operation (e.g. API operation-level).

Figure 10:
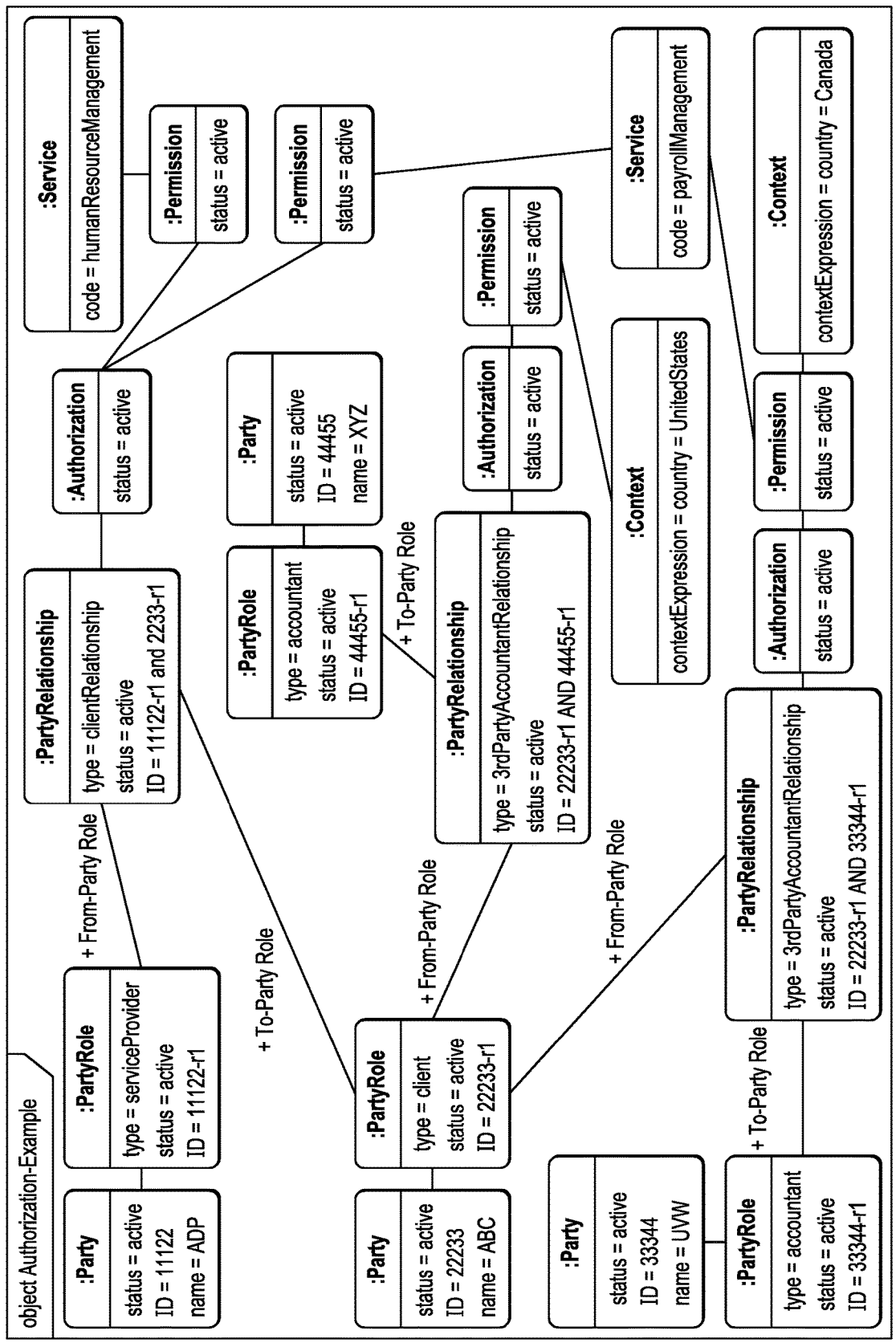
FIG. 10 illustrates a specific instantiation of the data model shown in FIGS. 9A and 9B with respect to the B2B2B nested party relationship shown in FIG. 4, in accordance with an illustrative embodiment.

FIG. 10 illustrates a specific instantiation of the data model shown in FIGS. 9A and 9B with respect to the B2B2B nested party relationship shown in FIG. 4, in accordance with an illustrative embodiment. Instantiation 1000 thus is an instantiated data model which describes the "client's partner" scenario in FIG. 4. Here, ABC, and ADP client, has business relationships with other organizations: UVW and XYZ. UVW provides accounting services for its client ABC in Canada, while XYZ provides accounting services for its client, ABC, in the United States.

Figure 11:
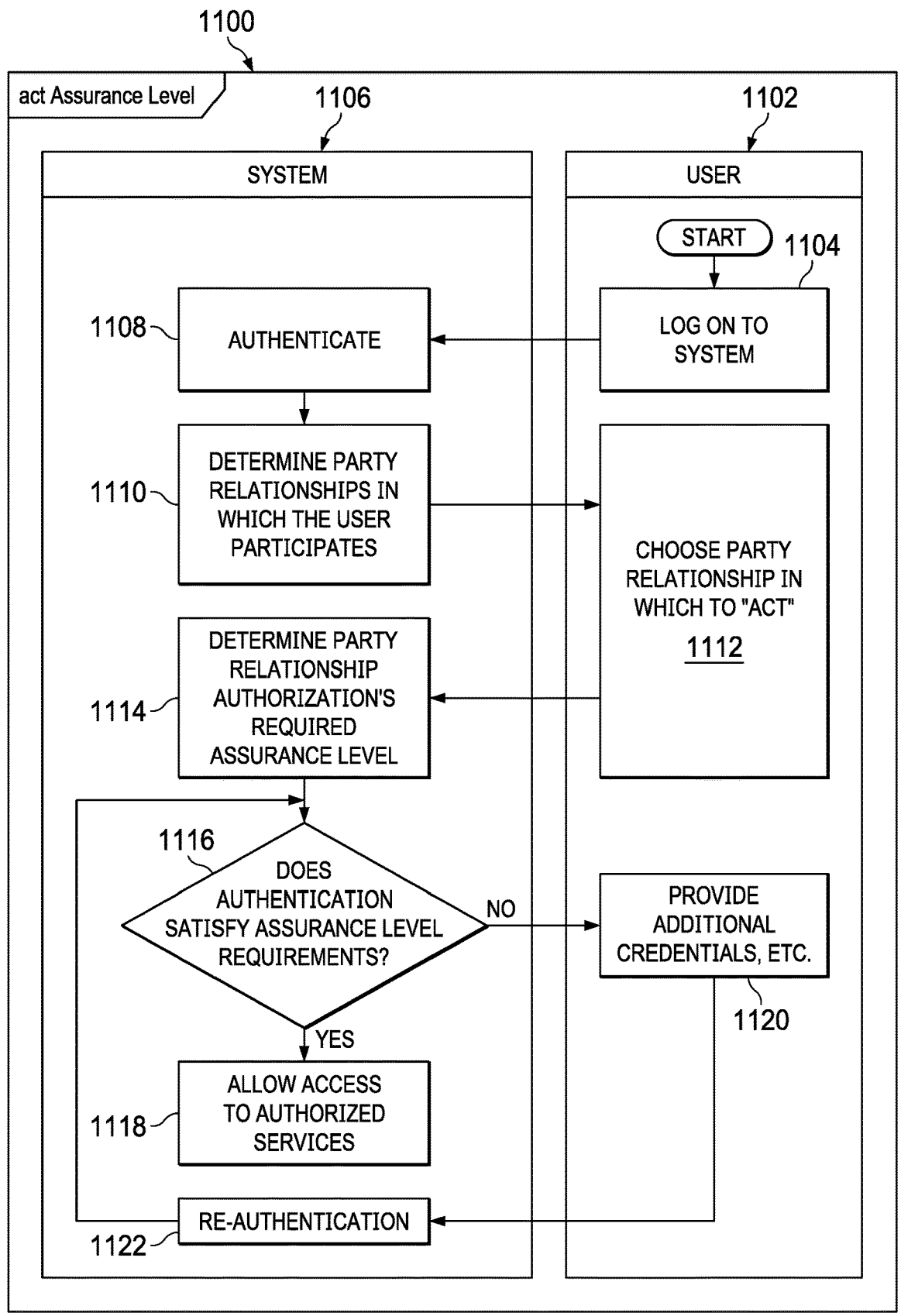
FIG. 11 illustrates an example of authentication between a user's computer and a service provider's computer using a data model such as those shown in FIG. 9A and 9B or FIG. 10, as well as assurance level requirements for the selected party relationship, in accordance with an illustrative embodiment.

FIG. 11 illustrates an example of authentication between a user's computer and a service provider's computer using a data model such as those shown in FIGS. 9A and 9B or FIG. 10, as well as assurance level requirements for the selected party relationship, in accordance with an illustrative embodiment. Method 1100 demonstrates a user being authenticated from a client computer to a server computer in the context of the party relationship (as the to-party role) in which the user chooses to act.

On user side 1102, the user initially logs onto the system (operation 1104). Then, on system side 1106, the server authenticates the user (operation 1108). The server then determines party relationships in which the user participates (operation 1110) using the data model, such as those shown in FIG. 9A and FIG. 9B.

Thereafter, back on user side 1102, the user computer chooses the party relationship in which to act (operation 1112). The server receives this information and determines party relationship authorizations required assurance level (operation 1114), possibly using the data model.

The server then determines whether the authentication satisfies the assurance level requirements (operation 1116). If so, then the server allows access to the authorized services (operation 1118) on the server. If not, then the server requests additional credentials, with the user providing the additional credentials (operation 1120). The server then performs re-authentication (operation 1122), and method 1100 returns to operation 1120. Ultimately, if the authentication is denied or granted, then the process may terminate.

Figure 12:
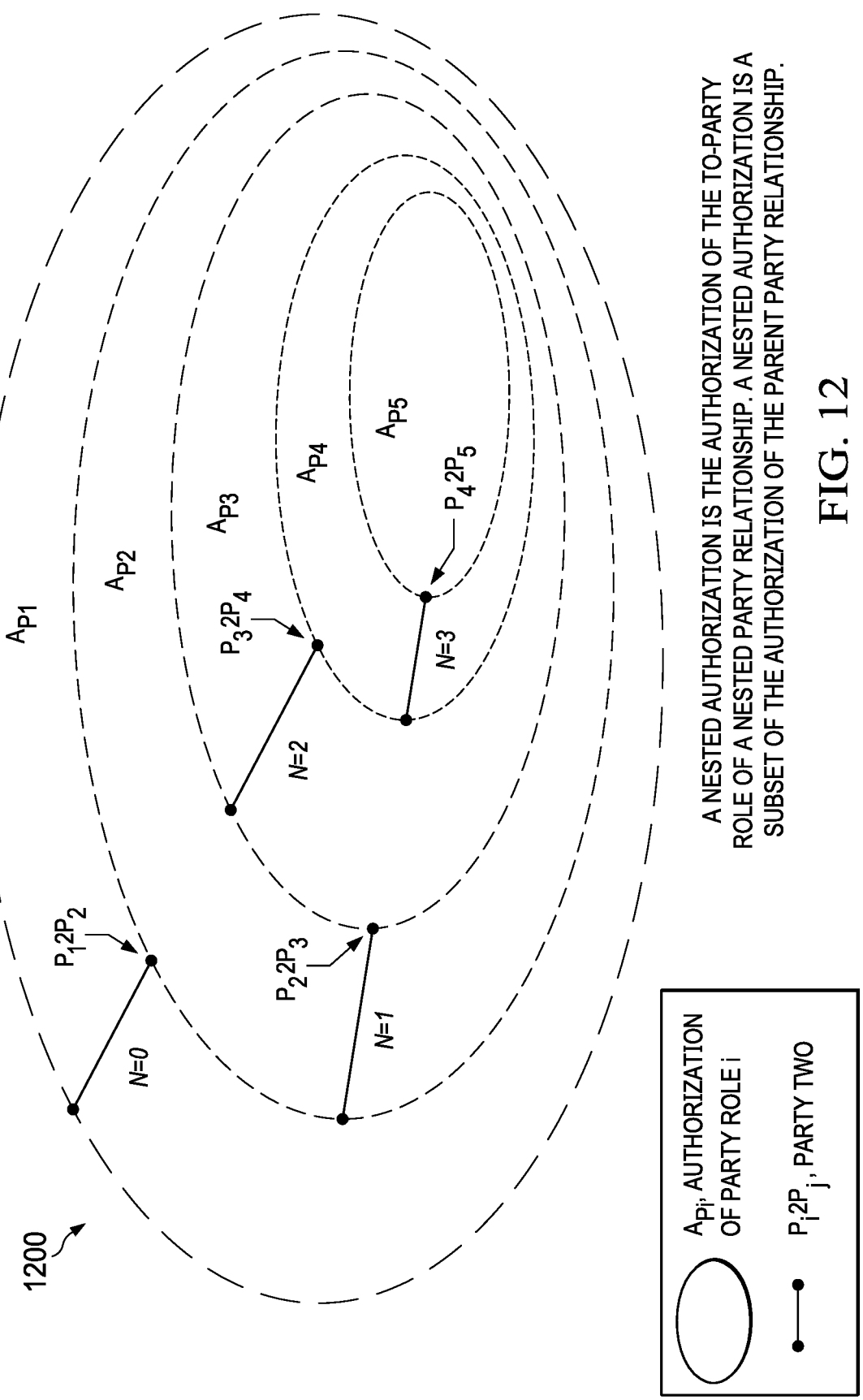
FIG. 12 illustrates a P2P.2P authorization model for nested authorizations, in accordance with an illustrative embodiment.

FIG. 12 illustrates a P2P.2P authorization model for nested authorizations, in accordance with an illustrative embodiment. Authorization model 1200 demonstrates nested authorizations useable in a data model, such as those described above.

In authorization model 1200, a nested authorization is the authorization of the to-party role of a nested party relationship. A nested authorization is a subset of the authorization of the parent party relationship.

Authorizations are a partially ordered set in the party relationship hierarchy. A party P1 authorizes party P2; (P1, P2) is the primary party relationship. Party P2 authorized party P3; (P2, P3) is a nested party relationship dependent upon (P1, P2). Party P3 authorized party P4; (P3, P4) is a nested party relationship dependent upon (P2, P3). Party P4 authorized party P5; (P4, P5) is a nested party relationship dependent upon (P3, P4).

Figure 13:
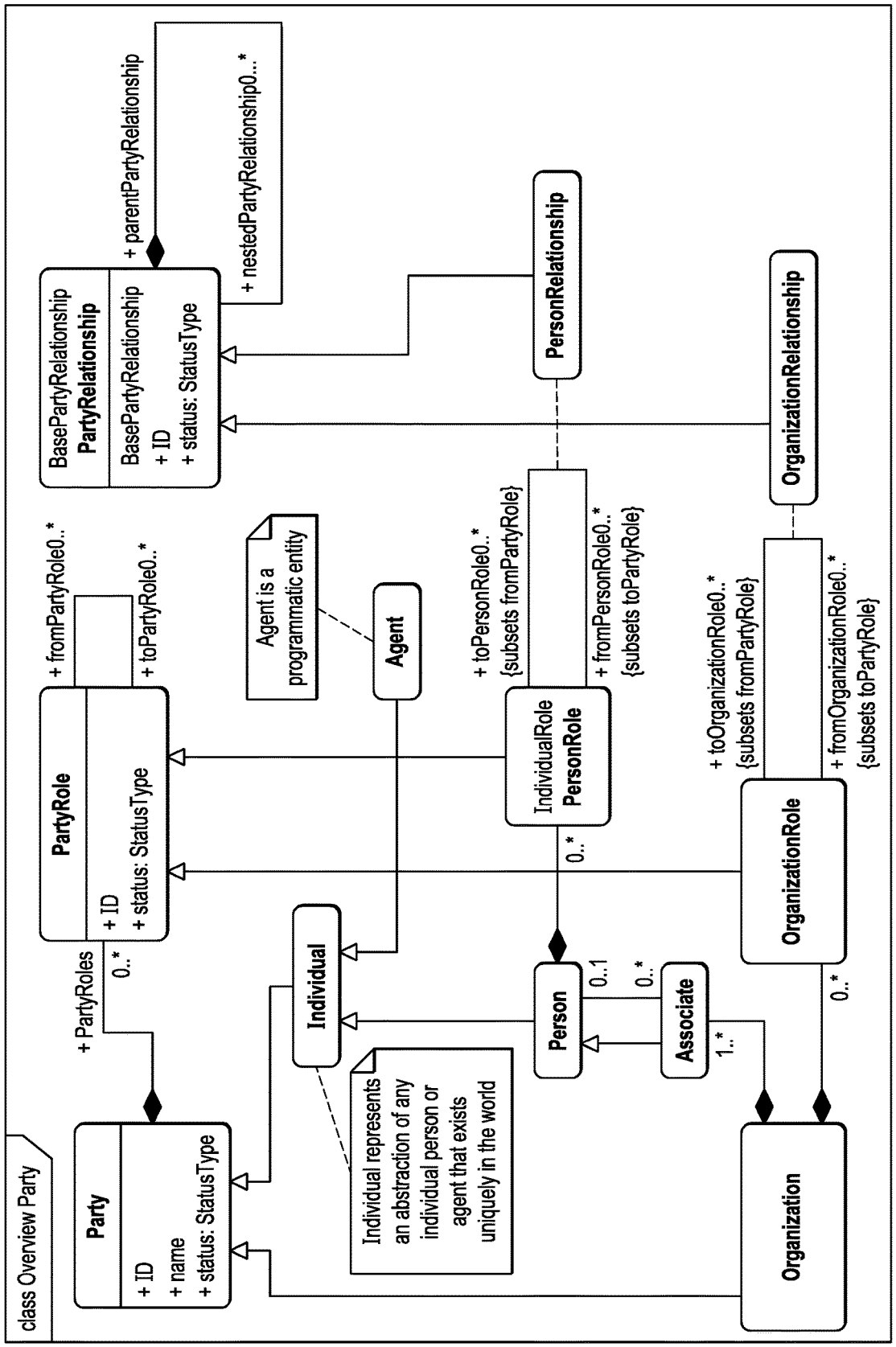
FIG. 13 illustrates another example of a nested party data model useable by a computer to provide proper authorization when a request for service is made from a client computer to a service provider's computer, in accordance with an illustrative embodiment.

FIG. 13 illustrates another example of a nested party data model useable by a computer to provide proper authorization when a request for service is made from a client computer to a service provider's computer, in accordance with an illustrative embodiment. Data model 1300 uses industry-standard legends, designations, and nomenclature to indicate how to create a data structure which implements data model 1300. Data model 1300 may be used to implement a nested party relationship in a manner which a computer can use to perform calculations to establish a computerized communication and/or authentication when an access to services is requested of the primary party.

Data model 1300 represents the person and associate in the party model. In the case that a given natural person works for two independent organizations (i.e. ADP clients), there will be two instances of the "associate" class. There will, however be only one instance of the person class. Therefore, this association between "associate" and "person" describes which associates are, in fact, the same natural person.

It can occur that an organization may wish to hold data about a person that is not consistent with that held against the natural person. For example, it could be that a person has a temporary address which they wish only one organization to be aware of such that this different address is reflected in the associate class only and not on the person class. For this reason, the associate is also a specialization of person in order that it too has a duplication of the attributes of the person. Where this model is used in a system that does not have the concept of "person" (such that person is presented in the abstract), the specialization of "associate" implies that the attributes of "person" are available in the associate class.

Since "associate" is a specialization of "person", it is possible for "associate" to have its own "person roles" distinct from the "person roles" of the corresponding human person. In this way, a given organization could model "a spouse" despite this object not being recorded on the "person".

Moreover, there may well be new relationships between people in the form of "associates" that are not recorded at the "person" class. For example, human person A manages human person B, but where this relationship is not recorded through the organization structure. "Manages" is only a relationship between people in the context of an organization; hence, it is at the associate level rather than the person level.

Figure 14:
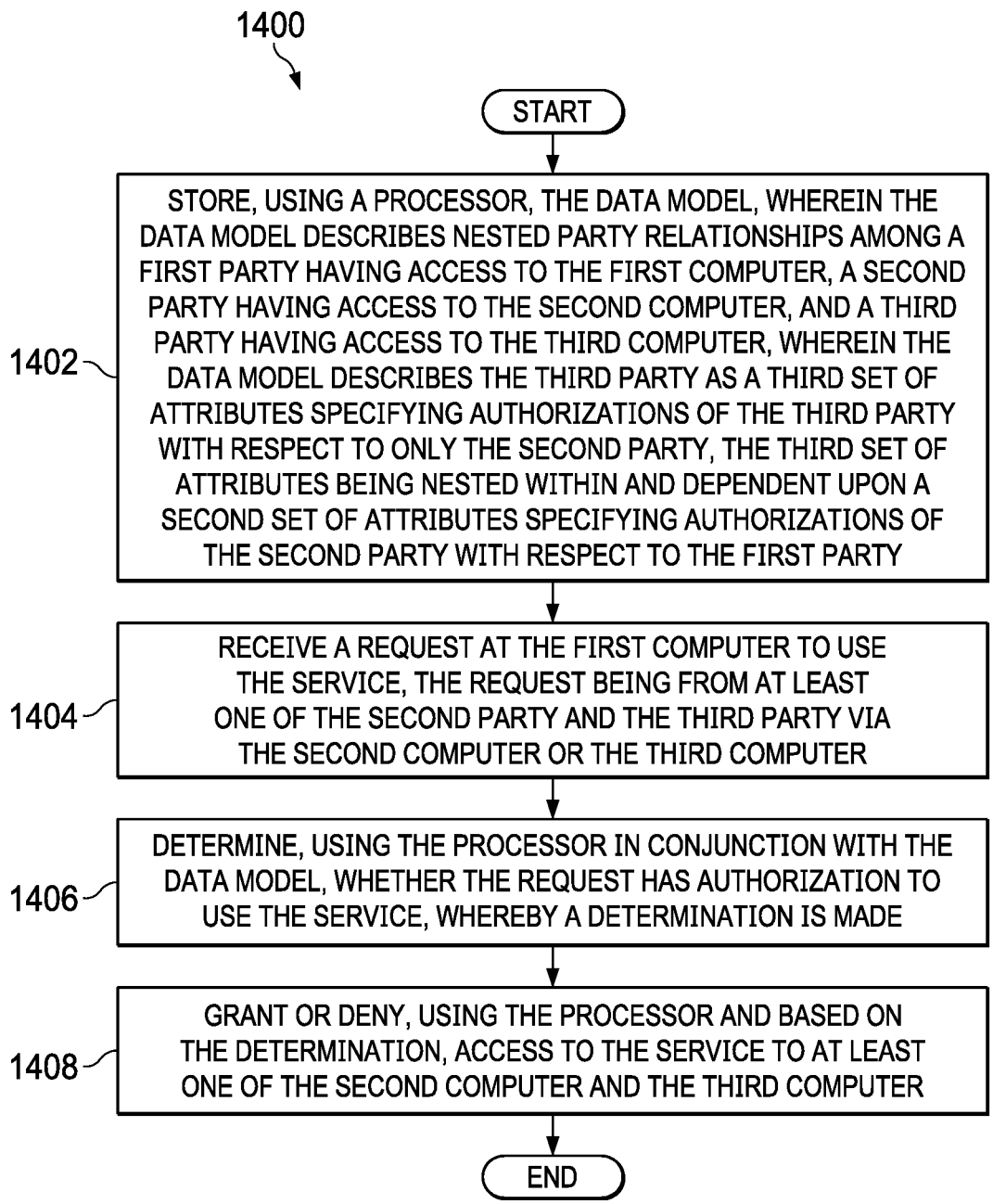
FIG. 14 illustrates a method for using a data model to enable authorization and communication between computers including a first computer configured to provide a service, a second computer in communication with the first computer and configured to consume the service, and a third computer in communication with one or both of the first computer and the second computer, in accordance with an illustrative embodiment.

FIG. 14 illustrates a method for using a data model to enable authorization and communication between computers including a first computer configured to provide a service, a second computer in communication with the first computer and configured to consume the service, and a third computer in communication with one or both of the first computer and the second computer, in accordance with an illustrative embodiment. Method 1400 may be implemented using a processor in conjunction with a P2P.2P data model, such as those described with respect to FIGS. 9A and 9B, FIG. 10, and FIG. 13.

Method 1400 includes storing, using a processor, the data model, wherein the data model describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party (operation 1402). Method 1400 also includes receiving a request at the first computer to use the service, the request being from at least one of the second party and the third party via the second computer or the third computer (operation 1404).

Method 1400 also includes determining, using the processor in conjunction with the data model, whether the request has authorization to use the service, whereby a determination is made (operation 1406). Method 1400 also includes granting or denying, using the processor and based on the determination, access to the service to at least one of the second computer and the third computer (operation 1408). In one illustrative embodiment, the method may terminate thereafter.

Method 1400 may be varied. For example, prior to operation 1402, method 1400 may include creating the data model.

Other variations are possible. For example, the request may be received from the third computer via the second computer. In another illustrative embodiment, the data model includes a first data structure specifying a party relationship, a second data structure specifying a base party relationship, and a third data structure specifying a party relationship type.

In still another illustrative embodiment, the base party relationship is a party relationship description that allows for the specification of an authorization by the "fromPartyRole" to a "toPartyRoleType" as defined in the third data structure, whereby a role-based authorization is defined in the data model. In yet another illustrative embodiment, the first data structure is an associative entity that resolves a "many-to-many" relationship that exists between two party roles.

In a further illustrative embodiment, the first data structure includes data which indicates an assurance level indicating authentication requirements in order for authorization to be granted. In a yet further illustrative embodiment, the data model further comprises an authorization template configured to instantiate an authorization for either the base party relationship or the party relationship. Continuing this example, the data model further comprises a context bound to the authorization, the context defining a boundary or a scope of the authorization to data records specific to an object. Alternatively, the object comprises a geopolitical region, a party, an organizational unit, a person, an agent, a business process, a party role, or combinations thereof.

The illustrative embodiments also contemplate a computer which implements the above computer-implemented method. For example, the computer may include a processor and a non-transitory computer readable storage medium storing program code which, when executed by the processor, performs the above computer-implemented method.

The illustrative embodiments also contemplate a data model, stored on a non-transitory computer readable storage medium, executable by a computer to enable authorization and communication between computers including a first computer configured to provide a service, a second computer in communication with the first computer and configured to consume the service, and a third computer in communication with one or both of the first computer and the second computer. This data model may have some of the additional aspects of the data model described with respect to method 1400.

Still other variations are possible. Thus, the illustrative embodiments are not necessarily limited to the examples provided above.

Figure 15:
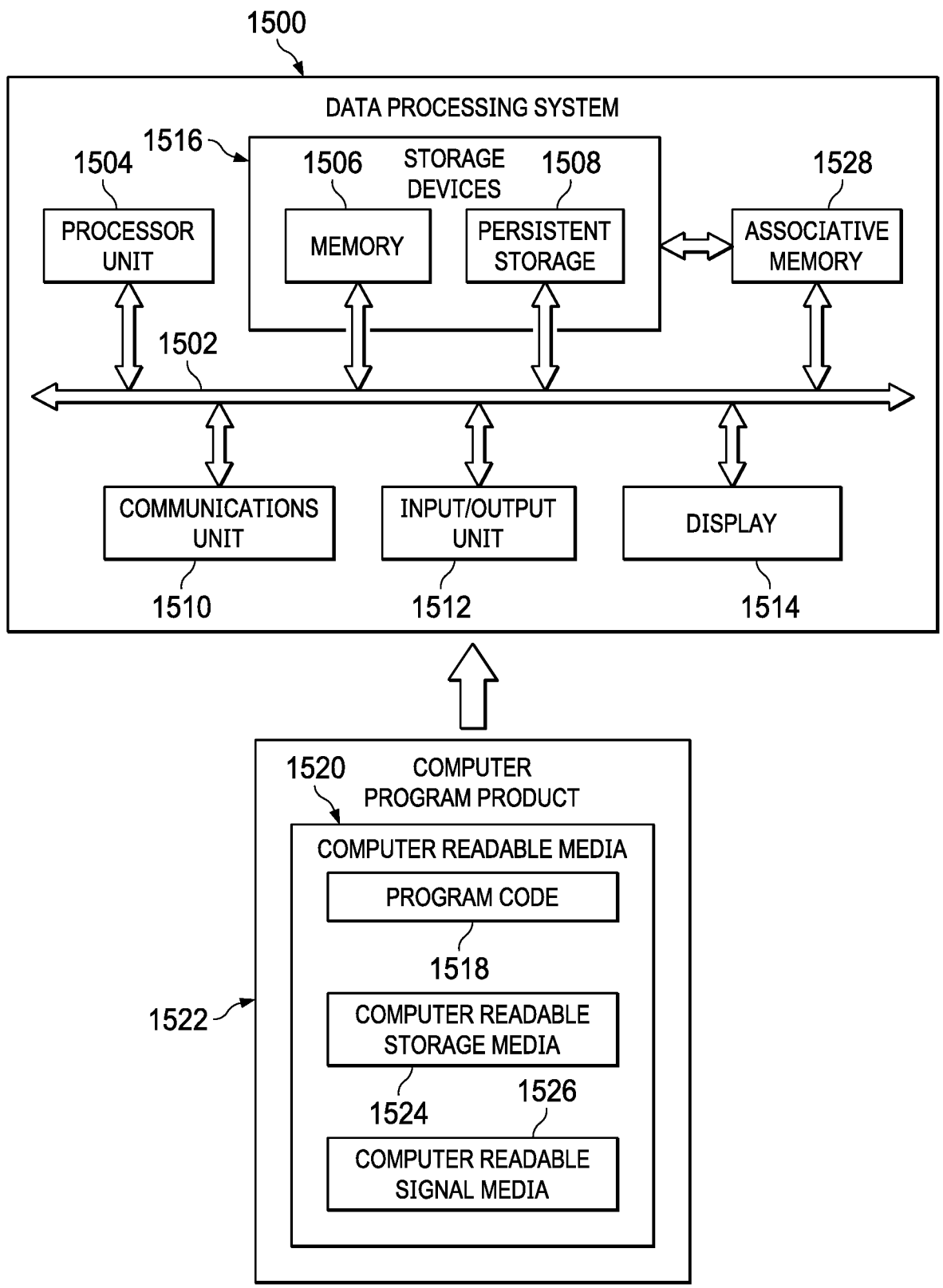
FIG. 15 illustrates a data processing system, in accordance with an illustrative embodiment.

Turning now to FIG. 15, an illustration of a data processing system is depicted in accordance with an illustrative embodiment. Data processing system 1500 in FIG. 15 is an example of a data processing system 1500 that may be used to implement the illustrative embodiments, such those described with respect to FIG. 2 through FIG. 14. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. This software may be a content addressable memory, or software for implementing the processes described elsewhere herein. Thus, for example, software loaded into memory 1506 may be software for executing the methods described with respect to FIG. 2 through FIG. 14. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage 1508, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system 1500 through computer readable signal media 1526 for use within data processing system 1500. For instance, program code 1518 stored in a computer readable storage medium 1524 in a server data processing system 1500 may be downloaded over a network from the server to data processing system 1500. The data processing system 1500 providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system 1500 including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1502.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for using a data model to enable authorization and communication between computers including a first computer configured to provide a service, a second computer in communication with the first computer and configured to consume the service, and a third computer in communication with one or both of the first computer and the second computer, the method comprising:
    storing, using a processor, the data model, wherein the data model describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party, and wherein the data model includes a first data structure specifying a party relationship, a second data structure specifying a base party relationship, and a third data structure specifying a party relationship type, and wherein the first data structure includes data which indicates an assurance level indicating authentication requirements in order for authorization to be granted;
    receiving a request at the first computer to use the service, the request being from at least one of the second party and the third party via the second computer or the third computer;
    determining, using the processor in conjunction with the data model, whether the request has authorization to use the service, whereby a determination is made; and
    granting or denying, using the processor and based on the determination, access to the service to at least one of the second computer and the third computer.

2. The method of claim 1 further comprising:
    creating the data model.

3. The method of claim 1, wherein the request is received from the third computer via the second computer.

4. The method of claim 1, wherein the base party relationship is a party relationship description that allows for the specification of an authorization by the "fromPartyRole" to a "toPartyRoleType" as defined in the third data structure, whereby a role-based authorization is defined in the data model.

5. The method of claim 4, wherein the first data structure is an associative entity that resolves a "many-to-many" relationship that exists between two party roles.

6. The method of claim 1, wherein the data model further comprises an authorization template configured to instantiate an authorization for either the base party relationship or the party relationship.

7. The method of claim 6, wherein the data model further comprises a context bound to the authorization, the context defining a boundary or a scope of the authorization to data records specific to an object.

8. The method of claim 7, wherein the object comprises a geopolitical region, a party, an organizational unit, a person, an agent, a business process, a party role, or combinations thereof.

9. The method of claim 1, wherein the authorizations of the third party with respect to the second party and the authorizations of the second party with respect to the first party are permissions to access a service.

10. The method of claim 9, wherein the service comprises at least one of coarse-grain business service or finer-grain decomposition of business service.

11. A computer comprising:
a processor; and
a non-transitory computer readable storage medium storing program code which, when executed by the processor, performs a computer-implemented method for using a data model to enable authorization and communication between computers including a first computer configured to provide a service, a second computer in communication with the first computer and configured to consume the service, and a third computer in communication with one or both of the first computer and the second computer, the program code comprising:
program code for storing, using a processor, the data model, wherein the data model describes nested party relationships among a first party having access to the first computer, a second party having access to the second computer, and a third party having access to the third computer, wherein the data model describes the third party as a third set of attributes specifying authorizations of the third party with respect to only the second party, the third set of attributes being nested within and dependent upon a second set of attributes specifying authorizations of the second party with respect to the first party, and wherein the data model includes a first data structure specifying a party relationship, a second data structure specifying a base party relationship, and a third data structure specifying a party relationship type, and wherein the first data structure includes data which indicates an assurance level indicating authentication requirements in order for authorization to be granted;
program code for receiving a request at the first computer to use the service, the request being from at least one of the second party and the third party via the second computer or the third computer;
program code for determining, using the processor in conjunction with the data model, whether the request has authorization to use the service, whereby a determination is made; and
program code for granting or denying, using the processor and based on the determination, access to the service to at least one of the second computer and the third computer.

12. The computer of claim 11, wherein the program code further comprises:
program code for creating the data model.

13. The computer of claim 11, wherein the base party relationship is a party relationship description that allows for the specification of an authorization by the "fromPartyRole" to a "toPartyRoleType" as defined in the third data structure, whereby a role-based authorization is defined in the data model.

14. The computer of claim 11, wherein the data model further comprises an authorization template configured to instantiate an authorization for either the base party relationship or the party relationship, and wherein the data model further comprises a context bound to the authorization, the context defining a boundary or a scope of the authorization to data records specific to an object.

15. The computer of claim 11, wherein the authorizations of the third party with respect to the second party and the authorizations of the second party with respect to the first party comprise permissions to access a service, and wherein the service comprises at least one of coarse-grain business service or finer-grain decomposition of business service.

* * * * *